United States Patent [19]
Weaver

[11] 3,980,634
[45] Sept. 14, 1976

[54] PHTHALIMIDYL-AZO ANILINE TYPE COMPOUNDS AND POLYESTER FIBERS DYED THEREWITH

[75] Inventor: Max Allen Weaver, Kingsport, Tenn.

[73] Assignee: Eastman Kodak Company, Rochester, N.Y.

[22] Filed: July 2, 1973

[21] Appl. No.: 376,048

[52] U.S. Cl. ............................. 260/152; 260/154; 260/157; 260/158; 260/325 R; 260/325 PH
[51] Int. Cl.² ................. C09B 29/08; C09B 29/36; D06P 3/52
[58] Field of Search ........... 260/152, 156, 157, 165, 260/158

[56] References Cited
UNITED STATES PATENTS

| | | | |
|---|---|---|---|
| 1,758,313 | 5/1930 | Eckert et al. | 260/152 |
| 2,159,542 | 5/1939 | Apothecker et al. | 260/206 X |
| 2,961,438 | 11/1960 | Fuchs et al. | 260/152 |
| 3,402,166 | 9/1968 | Heckl et al. | 260/152 |
| 3,551,407 | 12/1970 | Dehnert et al. | 260/152 |
| 3,562,247 | 2/1971 | Dehnert et al. | 260/152 |
| 3,591,324 | 7/1971 | Dehnert et al. | 260/152 |

OTHER PUBLICATIONS

Elingsfeld et al., Chemical Abstracts, vol. 79, p. 42, Item No. 127366k (1973).

*Primary Examiner*—Floyd D. Higel
*Attorney, Agent, or Firm*—Donald W. Spurrell; Daniel B. Reece, III

[57] ABSTRACT

Monoazo compounds containing a phthalimidyl diazo component bearing on the aromatic ring thereof one or two substituents such as halogen or cyano and an aniline disperse azo dye coupling component which may have a substituent such as acetamido, are useful for dyeing polyester fibers on which the compounds exhibit good fastness and dyeability properties.

8 Claims, No Drawings

PHTHALIMIDYL-AZO ANILINE TYPE COMPOUNDS AND POLYESTER FIBERS DYED THEREWITH

This invention relates to certain novel azo compounds and, more particularly, to disperse azo compounds containing a ring-substituted, phthalimidyl diazo component and an aniline coupling component and to polyester fibers dyed with such compounds.

The novel compounds of the invention have the general formula

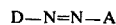  (1)

wherein D is a 3- or 4-phthalimidyl group having the formula

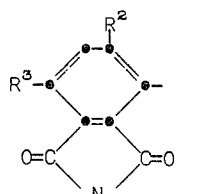 or 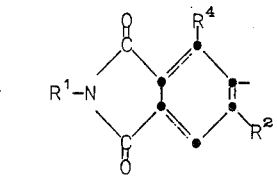

(II)   (III)

wherein
$R^1$ is hydrogen or an organic radical having a molecular weight of not more than 200;
$R^2$ is lower alkyl, halogen, cyano, nitro, lower alkylsulfonyl, arylsulfonyl, arylthio, aryl-lower-alkylthio, cyclohexylthio, 2-pyrimidinylthio, 2-azolylthio, lower alkoxy or aryloxy;
$R^3$ is halogen or nitro;
$R^4$ is hydrogen or any of the substituents, except lower alkyl, which $R^2$ can represent; and
A is an aniline disperse azo dye coupling component.

The novel compounds of the invention produce yellow to blue shades on polyester, polyamide and cellulose acetate fibers when applied thereto according to conventional disperse dyeing procedures. The compounds, in general, exhibit good to excellent dyeability properties, fastness to light and resistance to sublimation.

The azo compounds containing a phthalimidyl diazo component which are known do not contain any substituents, such as those represented by $R^2$, $R^3$ and $R^4$, on the aromatic ring thereof. Therefore, the unique structure of my compounds renders them distinct from known azo compounds.

The substituents encompassed by the generic terminology appearing in the definitions of $R^1$, $R^2$, $R^3$ and $R^4$ are well-known in the art. As used herein to describe a group containing an alkyl moiety, "lower" designates a carbon content of up to about four carbon atoms. The aryl moiety of the aryl and aryl-containing groups such as aroyl and arylene can be unsubstituted phenyl and phenyl substituted with nonionic substituents, such as lower alkyl, lower alkoxy, halogen, cyano, lower alkoxycarbonyl, etc. The 2-azolylthio substituents which $R^4$ can represent include 2-benzothiazolylthio, 2-thiazolylthio, 1,3,4-thiadiazol-2-ylthio, 1,2,4-triazol-3-ylthio, etc.

My novel azo compounds are prepared by diazotizing a halogenated or nitrated aminophthalimide and coupling the resulting diazonium salt with a compound having the formula H-A. If desired, any halogen atom present on the diazo component of the resulting azo compound in a position ortho to the azo group can be replaced with various groups by the reaction thereof with nucleophiles such as cyanides, sulfinates, mercaptides, alkoxides, aryloxides, etc.

The 3-aminophthalimides in which $R^1$ is hydrogen, are prepared by reacting 3-nitrophthalic anhydride with ammonia followed by the reduction of the nitro group to the amino group whereas the analogous 4-amino compounds are prepared by reacting phthalic anhydride with ammonia followed by nitration and reduction. The corresponding aminophthalimide compounds in which $R^1$ is a substituent are prepared by the mentioned techniques except that a primary amine is substituted for the ammonia. Alternatively, the aminophthalimide compounds in which R is a substituent can be prepared by reacting either phthalimide or a nitrophthalimide with an alkylating agent such as an aliphatic halide. The particular substituent represented by $R^1$ is, in general, not critical. However, since our novel azo compounds are disperse dye compounds, substituent $R^1$ is free of water-solubilizing groups such as sulfonate and carboxylate salt groups. The primary amines from which substituent $R^1$ can be derived have the formula $R^1$—$NH_2$ in which R is an unsubstituted or substituted aliphatic, alicyclic, aromatic or heterocyclic residue having a molecular weight of not more than 200. In view of the vast number of primary amines and aliphatic halides which are known and/or can be synthesized by conventional procedures and since the substituent represented by $R^1$ is not critical, no further elaboration on the groups represented by $R^1$ is warranted. However, it is preferred that substituent $R^1$ be devoid of amino groups, including unsubstituted and substituted amino groups, since such groups can affect detrimentally the synthesis of the azo compounds. The substituents described above in the definition of $R^2$ and those described hereinafter in the definition of $R^7$ are typical of the groups which $R^1$ can represent.

Both the 3-aminophthalimides and 4-aminophthalimides can be halogenated to give the corresponding dihalo compounds, 3-amino-4,6-dihalophthalimides and 4-amino-3,5-dihalophthalimides. If only one equivalent of halogen is employed, the 4-aminophthalimides can be monohalogenated in the 5-position. The 3-amino-6-nitrophthalimides are prepared by nitrating the corresponding 3-acetamidophthalimides followed by hydrolysis of the acetamido group to the free amine. The 3-amino-6-nitrophthalimides can be halogenated to yield the 3-amino-4-halo-6-nitrophthalimides. The nitration and halogenation reactions used to synthesize the diazo precursors are conducted according to conventional techniques. Preferably, bromine is used as the halogenating agent.

The aminophthalimides prepared as described in the preceding paragraph are diazotized and coupled with an aniline coupler to yield azo compounds having the formulas

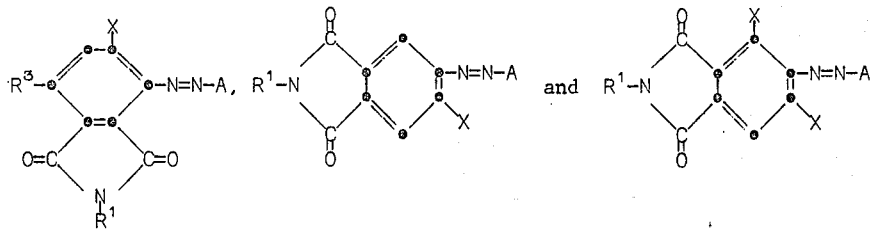

$R^1$, $R^3$ and A are defined above and X is halogen, preferably bromine. As mentioned above, the halogen atoms X can be replaced by reacting the azo compounds with various nucleophiles.

The groups represented by A are well-known in the art and are characterized by being free of groups, such as sulfonates, which will render the compounds of formula (I) water-soluble. Some of the patent literature describing disperse azo dye coupling components is set forth in co-pending Application Serial No. 71,165 filed September 11, 1970, now U.S. Pat. No. 3,829,410 which issued on Aug. 13, 1974. Typical of the substituents represented by V are the groups represented by the formula

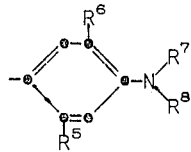

wherein
$R^5$ is hydrogen, lower alkyl, lower alkoxy, halogen or a group having the formula —NH—$R^9$ in which $R^9$ is an organic acyl group;
$R^6$ is hydrogen, lower alkyl or lower alkoxy;
$R^7$ individually is alkyl containing one to about eight carbon atoms; cyclohexyl; cyclohexyl substituted with lower alkyl; or lower alkyl substituted with lower alkoxy, aryl, aryloxy, cyclohexyl, cyano, lower alkanoyloxy, lower alkoxycarbonyl, lower alkoxycarbonyloxy, aroyloxy, lower alkylcarbamoyloxy, arylcarbamoyloxy, or a group having the formula

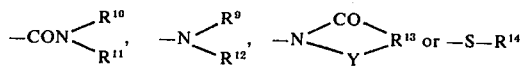

where
$R^{10}$ individually is hydrogen, lower alkyl or aryl;
$R^{11}$ individually is hydrogen or lower alkyl;
$R^{10}$ and $R^{11}$ collectively are -(CH$_2$)$_5$- or -CH$_2$CH$_2$OCH$_2$CH$_2$-;
$R^9$ is an organic acyl radical;
$R^{12}$ is hydrogen, lower alkyl, aryl, or cyclohexyl;
$R^{13}$ is ethylene, propylene, trimethylene, o-cyclohexylene, or o-arylene, or when X is —CO—, $R^{13}$ also can be —NHCH$_2$—, —N(lower alkyl)CH$_2$—, —SCH$_2$—, —OCH$_2$—, or —CH$_2$OCH$_2$—;
Y is —CH$_2$—, —CO—, or —SO$_2$—; and
$R^{14}$ is aryl, benzyl, cyclohexyl, 1,2,4-triazol-3-yl, or 2-benzothiazolyl;

$R^8$ individually is hydrogen; lower alkyl; lower alkyl substituted with lower alkoxy, aryl, aryloxy, cyclohexyl, lower alkanoyloxy, lower alkoxycarbonyl or lower alkoxycarbonyloxy; allyl; or aryl; and
$R^7$ and $R^8$ in combination is a group having the formula —CH$_2$CH$_2$—Y—CH$_2$CH$_2$— in which Y is —CH$_2$—, —N($R^9$)—, —O—, —S—, —SO— or —SO$_2$—.

The substituents represented by $R^5$ through $R^{14}$ are well-known or are chemically equivalent to groups disclosed in the prior art pertaining to disperse azo dyes.

The organic acyl radicals represented by $R^9$ preferably are formyl, lower alkanoyl, aroyl, cyclohexylcarbonyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, furoyl, etc. The alkanoyl groups can be substituted with substituents such as halogen, aryl, cyano, lower alkoxy, aryloxy, benzyloxy, lower alkylthio, lower alkylsulfonyl, lower alkanoyloxy, etc. The alkylsulfonyl groups also can be substituted, for example, with cyano, hydroxy, halogen and the like. The alkoxycarbonyl groups can be substituted, for example, with hydroxy, alkoxy and cyano. Acetyl, propionyl, butyryl, cyanoacetyl, chloroacetyl, trifluoroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethylsulfonyl, and 2-chloroethylsulfonyl are examples of the alkanoyl, alkoxycarbonyl and alkylsulfonyl groups which $R^9$ can represent. Dimethylcarbamoyl, ethylcarbamoyl, propylcarbamoyl, butylcarbamoyl, phenylcarbamoyl and dimethylcarbamoyl are examples of the substituted carbamoyl groups. The unsubstituted and substituted alkanoyl, aroyl and alkoxycarbonyl groups are preferred.

The substituted alkyl groups represented by $R^7$ preferably are arylmethyl, arylethyl, cyclohexylmethyl, 2-cyanoethyl, or a group having the formula —Z—$R^{15}$ in which Z is ethylene, propylene, trimethylene, or tetramethylene and $R^{15}$ is any of the substituents, except aryl, cyano, and cyclohexyl, which can be present on the substituted alkyl groups represented by $R^7$ as defined above. Similarly, the preferred substituted alkyl groups represented by $R^8$ are arylmethyl, arylethyl, cyclohexylmethyl or a group having the formula —Z—$R^{16}$ in which Z is defined above and $R^{16}$ is any of the substituents, except aryl and cyclohexyl, which can be present on the substituted alkyl groups which $R^{16}$ can represent according to the above definitions thereof. It is also preferred that one of $R^6$ and $R^8$ is hydrogen.

A group of my novel compounds which are especially preferred because of their cost:performance ratio are those having the formulas

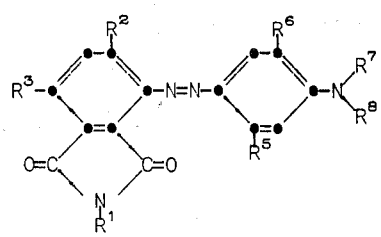

and

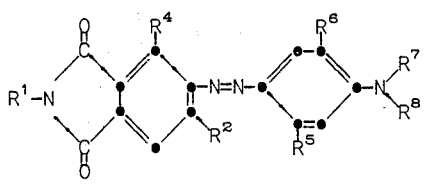

wherein
- $R^1$ is lower alkyl; arylmethyl; cyclohexylmethyl; 2-cyanoethyl; 2-carbamoylethyl; aryl; cyclohexyl; or the group $-Z-R^{17}$ in which Z is ethylene, propylene, or trimethylene and $R^{17}$ is succinimido, glutarimido, phthalimido, hydroxy, lower alkanoyloxy, 2-pyrrolidinone, or lower alkoxy;
- $R^2$ is hydrogen, chlorine, bromine or cyano;
- $R^3$ is chlorine, bromine or nitro;
- $R^4$ is chlorine, bromine or cyano;
- $R^5$ is hydrogen, methyl, lower alkanoyl, benzamido or lower alkoxycarbonyl;
- $R^6$ is hydrogen or when $R^8$ is hydrogen, $R^6$ is methyl;
- $R^7$ is lower alkyl; allyl; cyclohexyl; arylmethyl; cyclohexylmethyl; 2-cyanoethyl; 2-carbamoylethyl; N-lower alkyl-2-carbamoylethyl; N,N-di-lower alkyl-2-carbamoylethyl; or the group $-Z-R^{15}$ in which Z is ethylene, propylene or trimethylene and $R^{15}$ is lower alkanoyloxy, lower alkoxycarbonyl, lower alkoxycarbonyloxy, succinimido, glutarimido, phthalimido, aroyloxy, lower alkoxy or the group

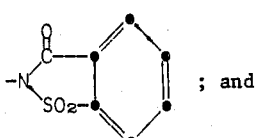

; and

- $R^8$ is hydrogen; lower alkyl; cyclohexyl; arylmethyl; cyclohexylmethyl; or the group $-Z-R^{16}$ in which Z is ethylene, propylene or trimethylene and $R^{16}$ is lower alkanoyloxy, lower alkoxycarbonyl or lower alkoxycarbonyloxy;

in which each aryl moiety is phenyl, tolyl, anisyl, ethoxyphenyl or chlorophenyl. When $R^7$ and $R^8$ both represent substituents conforming to the formulas $-Z-R^{15}$ and $-Z-R^{16}$ the Z groups preferably are the same.

Our novel compounds and their synthesis and use are further illustrated by the following example.

EXAMPLE 1

To 2-aminoethanol (12.2 g.) is added portionwise at 100°–125°C. 4-nitrophthalic anhydride (38.6 g.) with manual stirring. The mixture is heated gradually to 150°C. and kept at 150°–160°C. for 1 hr. with occasional stirring. The reaction mixture is cooled slightly and 50 ml. of ethanol is added. This solution is then drowned into 200 ml. of water. The product, N-(2-hydroxyethyl)-4-nitrophthalimide, is collected by filtration, washed with water and dried in air. It melts at 118°–119°C. and weighs 30.0 g.

EXAMPLE 2

N-(2-Hydroxyethyl)-4-nitrophthalimide (30.0 g.), ethanol (300 ml.), and Raney nickel (3.0 g.) are mixed and hydrogenated at 100°C. and 1500 psi. until hydrogen uptake ceases. The hot solution is filtered to remove the Raney nickel and the solvent evaporated to yield 4-amino-N-(2-hydroxyethyl)-phthalimide, the amine which melts at 171°–173°C.

EXAMPLE 3

A mixture of 4-nitrophthalimide (38.4 g.), iodoethane (46.8 g.), potassium carbonate (27.6 g.), and N,N-dimethylformamide (200 ml.) are heated and stirred at 95°–100°C. for 2 hr. An additional amount of iodoethane (46.8 g.) is added and the reaction mixture heated 4 hr. longer at 95°–100°C. The reaction mixture is drowned into 1500 ml. of water. The product, N-ethyl-4-nitrophthalimide, is collected by filtration, washed with water and recrystallized from methanol. It melts at 113°–114°C.

EXAMPLE 4

N-Ethyl-4-nitrophthalimide (28.0 g.) is hydrogenated in 400 ml. of ethanol and in the presence of Raney nickel catalyst (10 g.) at 100°C. and 1500 psi. pressure. The reaction mixture is filtered to remove the catalyst and the filtrate is concentrated to yield the product, 4-amino-N-ethylphthalimide, which is recrystallized from methanol-water mixture. It melts at 169°–171°C.

EXAMPLE 5

3-Nitrophthalimide (30.0 g.) is ethylated with iodoethane in the same manner as the 4-nitro isomer (Example 3) to yield 35.4 g. of N-ethyl-3-nitrophthalimide melting at 102°–103°C.

EXAMPLE 6

N-Ethyl-3-nitrophthalimide (35.4 g.) is hydrogenated as in Example 4 to yield 22.5 g. of 3-amino-N-ethylphthalimide which melts at 134°–136°C.

EXAMPLE 7

A mixture of 4-amino-N-ethylphthalamide (19 g.), sodium acetate (20 g.) and acetic acid (200 ml.) are stirred together at room temperature. Bromine (20 ml.) in acetic acid (50 ml.) is added dropwise with good stirring. A heavy precipitate forms after about one-half of the bromine has been added. Stirring is continued for 3 hours after the complete addition of the bromine. The reaction mixture is drowned into water (1 l.). The product, 4-amino-3,5-dibromo-N-ethylphthalimide, is collected by filtration, washed with water and recrystallized from ethanol. It weighs 32.5 g. and melts at 186°–187°C.

EXAMPLE 8

3-Amino-N-ethylphthalimide (9.5 g.) is dibrominated using the conditions of Example 7 to yield 16 g. of 3-amino-4,6-dibromophthalimide which melts at 177°–179°C.

EXAMPLE 9

To 150 ml. of conc. $H_2SO_4$ is added portionwise with stirring at about 10°C., 3-acetamidophthalimide (41 g.). With good stirring, fuming nitric acid (30 ml.) is added gradually at 10°–15°C. The reaction mixture is stirred for 30 min. and drowned onto about 1 l. of ice-water mixture. The slightly gummy solid is collected by filtration, washed with a minimum of water and slurried in hot ethanol. The mixture is chilled and the product, 3-acetamido-6-nitrophthalimide, collected by filtration. It melts at 150°–153°C.

EXAMPLES 10–17

Sodium nitrite (2.88 g.) is added gradually to 20 ml. of conc. $H_2SO_4$ with stirring. The solution is cooled and 1:5 acid (40 ml.) is added below 15°C. To this mixture is added 4-amino-5-bromo-N-ethyl phthalimide (10.8 g.; 0.04 mole), followed by 40 ml. of 1:5 acid, all below 5°C. The reaction mixture is stirred at 0°–5°C. for 2 hr. The following couplers (0.005 mole) are dissolved in 25 ml. of 1:5 acid.

N,N-Diethyl-m-acetamido aniline (Example 10)
N-Ethyl-N-n-propyl-m-acetamido aniline (Example 11)
N-β-Acetoxyethyl-N-ethyl-m-acetamido aniline (Example 12)
N,N-Di-β-acetoxyethyl-N-ethyl-m-acetamido aniline (Example 13)
N-β-Cyanoethyl-N-ethyl-m-acetamido aniline (Example 14)
N-Ethyl-N-β-succinimido ethyl-m-acetamido aniline (Example 15)
N-Benzyl-N-ethyl-m-acetamido aniline (Example 16)
N-β-Acetoxyethyl-N-cyclohexyl-m-acetamido aniline (Example 17)

To each chilled coupler solution is added a 0.005 mole aliquot of diazonium salt solution. The coupling mixtures are buffered by the addition of ammonium acetate and allowed to stand for 1 hr. The azo compounds are precipitated by the addition of water, collected by filtration, washed with water, and dried in air. If needed, the azo compounds are purified by slurrying in hot methanol, cooling, filtering, and washing with methanol.

EXAMPLES 18–25

4-Amino-3,5-dibromo-N-ethyl phthalimide (13.9 g., 0.04 mole) is diazotized and coupled with 0.005 mole of each of the following couplers as described in Examples 10–17:

N,N-Diethyl-m-acetamido aniline (Example 18)
N-β-Acetoxyethyl-N-ethyl-m-acetamido aniline (Example 19)
N-Cyclohexyl-N-ethyl-m-acetamido aniline (Example 20)
N,N-Di-β-acetoxyethyl-m-acetamido aniline (Example 21)
N,N-Di-β-acetoxyethyl-m-toluidine (Example 22)
N-β-Acetoxyethyl-N-β-cyanoethyl aniline (Example 23)
N,N-Di-β-acetoxyethyl aniline (Example 24)
N-β-cyanoethyl-N-ethyl-m-toluidine (Example 25)

EXAMPLE 26

The azo compound from Example 10 (0.50 g.), cuprous cyanide (0.2 g.), and dimethylformamide (DMF) (15 ml.) are heated with stirring at 95°–100°C. until reaction is completed as is evidenced by thin-layer chromatography. The reaction mixture is drowned in water. The product is collected by filtration, washed with water, and dried in air. The azo compound thus produced dyes polyester fibers violet shades fast to light and sublimation.

EXAMPLE 27

The dibromo azo compound from Example 18 (0.5 g.), cuprous cyanide (0.2 g.) and pyridine (15 ml.), are heated and stirred on a steambath for 15 min. Thin-layer chromatography should indicate completion of reaction. The product is precipitated by addition of water and then collected by filtration, washed with water, and dried in air. The azo dye produces fast blue shades on polyester fibers.

EXAMPLE 28

The bromo azo compound from Example 12 (0.5 g.), sodium benzenesulfinate (0.5 g.), DMF (20 ml.), and a trace of cuprous bromide are heated and stirred at 95°C. for 15 min. The azo compound is precipitated by drowning the reaction mixture in water and is collected by filtration, washed with water, and dried in air. The azo dye obtained produces violet shades on polyesters.

EXAMPLE 29

The bromo dye from Example 12 (0.5 g.), mercaptoethanol (0.5 g.), potassium carbonate (0.5 g.), DMF (20 ml.), and a trace of cuprous bromide are reacted at 95°C. The reaction is completed after 15 min. and then is drowned in water. The product is collected by filtration, washed with water, and dried in air. The azo dye produces fast red shades on polyamide fibers.

EXAMPLE 30

The bromo azo compound from Example 12 (0.5 g.), m-cresol (10 ml.), potassium carbonate (0.5 g.), and a trace of cuprous bromide are heated at 80°–85°C. for 30 min. The reaction mixture is drowned into 75 ml. ethanol plus 75 ml. water. The product crystallizes and is collected by filtration, washed with water, and dried in air. The azo dye produces bright red shades on polyesters.

EXAMPLE 31

The bromo azo compound from Example 12 (0.54 g.), sodium nitrite (0.2 g.), potassium carbonate (0.2 g.), DMF (10 ml.), and a trace of cuprous bromide are heated at 95°C for 45 min. The violet azo dye is isolated as in previous examples.

The azo compounds set forth in the following table are prepared according to the synthesis techniques described herein and conform to the formula

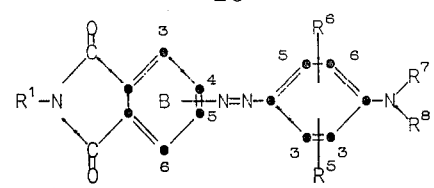

The structure of the azo compounds prepared in each of Examples 10 through 31 is set forth in the corresponding examples of Table I. The phthalimidyl group is bonded to the azo group at the 4-position in the compounds of Example 10–116 and 139 and at the 3-position in the compounds of Examples 117–138.

| Ex. No. | $R^1$ | Substituent(s) on Ring B | $R^5,R^6$ | $R^7$ | $R^8$ | Shade on Polyester Fibers |
|---|---|---|---|---|---|---|
| 10 | $-C_2H_5$ | 5-Br | H | $-C_2H_5$ | $-C_2H_5$ | Red |
| 11 | $-C_2H_5$ | 5-Br | H | $-C_2H_5$ | $-CH_2CH_2CH_3$ | Red |
| 12 | $-C_2H_5$ | 5-Br | H | $-CH_2CH_2OOCCH_3$ | $-CH_2CH_2OOCCH_3$ | Scarlet |
| 13 | $-C_2H_5$ | 5-Br | 3-NHCOCH$_3$ | $-CH_2CH_2OOCCH_3$ | $-CH_2CH_2OOCCH_3$ | Scarlet |
| 14 | $-C_2H_5$ | 5-Br | 3-NHCOCH$_3$ | $-CH_2CH_2CN$ | $-C_2H_5$ | Red |
| 15 | $-C_2H_5$ | 5-Br | 3-NHCOCH$_3$ | $-CH_2CH_2$NCOCH$_2$CH$_2$CO | $-C_2H_5$ | Red |
| 16 | $-C_2H_5$ | 5-Br | 3-NHCOCH$_3$ | $-CH_2C_6H_5$ | $-C_2H_5$ | Red |
| 17 | $-C_2H_5$ | 5-Br | 3-NHCOCH$_3$ | $-C_6H_{11}$ | $-CH_2CH_2OOCCH_3$ | Red |
| 18 | $-C_2H_5$ | 3,5-di-Br | 3-NHCOCH$_3$ | $-C_2H_5$ | $-C_2H_5$ | Red |
| 19 | $-C_2H_5$ | 3,5-di-Br | 3-NHCOCH$_3$ | $-CH_2CH_2OOCCH_3$ | $-C_2H_5$ | Red |
| 20 | $-C_2H_5$ | 3,5-di-Br | 3-NHCOCH$_3$ | $-C_6H_{11}$ | $-C_2H_5$ | Red |
| 21 | $-C_2H_5$ | 3,5-di-Br | 3-NHCOCH$_3$ | $-CH_2CH_2OOCCH_3$ | $-CH_2CH_2OOCCH_3$ | Brown |
| 22 | $-C_2H_5$ | 3,5-di-Br | 3-CH$_3$ | $-CH_2CH_2OOCCH_3$ | $-CH_2CH_2OOCCH_3$ | Brown |
| 23 | $-C_2H_5$ | 3,5-di-Br | H | $-CH_2CH_2CN$ | $-CH_2CH_2OOCCH_3$ | Brown |
| 24 | $-C_2H_5$ | 3,5-di-Br | H | $-CH_2CH_2OOCCH_3$ | $-CH_2CH_2OOCCH_3$ | Brown |
| 25 | $-C_2H_5$ | 3,5-di-Br | 3-CH$_3$ | $-CH_2CH_2CN$ | $-C_2H_5$ | Brown |
| 26 | $-C_2H_5$ | 5-CN | H | $-C_2H_5$ | $-C_2H_5$ | Violet |
| 27 | $-C_2H_5$ | 3,5-di-CN | 3-NHCOCH$_3$ | $-C_2H_5$ | $-C_2H_5$ | Blue |
| 28 | $-C_2H_5$ | 5-SO$_2$C$_6$H$_5$ | H | $-CH_2CH_2OOCCH_3$ | $-CH_2CH_2OOCCH_3$ | Violet |
| 29 | $-C_2H_5$ | 5-SCH$_2$CH$_2$OH | H | $-CH_2CH_2OOCCH_3$ | $-CH_2CH_2OOCCH_3$ | Red |
| 30 | $-C_2H_5$ | 5-OC$_6$H$_5$ | H | $-CH_2CH_2OOCCH_3$ | $-CH_2CH_2OOCCH_3$ | Red |
| 31 | $-C_2H_5$ | 5-NO$_2$ | H | $-CH_2CH_2OOCCH_3$ | $-CH_2CH_2OOCCH_3$ | Violet |
| 32 | $-C_2H_5$ | 5-Br | 3-CH$_3$ | $-CH_2CH_2CN$ | $-CH_2CH_2OOCCH_3$ | Scarlet |
| 33 | $-CH_2CH_2CH_3$ | 5-Br | 3-CH$_3$ | $-CH_2CH_2OOCCH_3$ | $-CH_2CH_2OOCCH_3$ | Scarlet |
| 34 | $-(CH_2)_3CH_3$ | 5-Br | 3-Cl | $-CH_2CH_2OOCCH_3$ | $-CH_2CH_2OOCCH_3$ | Scarlet |
| 35 | $-(CH_2)_3CH_3$ | 5-Br | H | $-CH_2CH_2SO_2CH_2CH_2-$ | | Orange |
| 36 | $-(CH_2)_3CH_3$ | 5-Br | 2-CH$_3$-5-NHCOCH$_3$ | $-C_2H_5$ | H | Red |
| 37 | $-(CH_2)_3CH_3$ | 5-Br | 2-CH$_3$-5-NHCOCH$_3$ | $-CH(CH_3)C_2H_5$ | H | Red |
| 38 | $-(CH_2)_3CH_3$ | 5-Br | 2-CH$_3$-5-NHCOCH$_3$ | $-CH_2CH_2CN$ | H | Red |
| 39 | $-(CH_2)_3CH_3$ | 5-Br | 2-CH$_3$-5-NHCOCH$_3$ | $-CH(CH_3)C_2H_5$ | H | Red |
| 40 | $-C_6H_{11}$ | 5-Br | 2-OCH$_3$-5-NHCOCH$_3$ | $-CH_2CH_2OOCCH_3$ | $-CH_2CH_2OOCCH_3$ | Rubine |
| 41 | $-C_6H_{11}$ | 5-Br | 2-OCH$_3$-5-CH$_3$ | $-CH_2CH_2OOCCH_3$ | $-CH_2CH_2OOCCH_3$ | Red |
| 42 | $-C_6H_{11}$ | 5-Br | 2,5-di-OCH$_3$ | $-CH_2CH_2OOCCH_3$ | $-CH_2CH_2OOCCH_3$ | Red |
| 43 | $-C_6H_{11}$ | 5-Br | 2-CH$_3$-5-OCH$_3$ | $-CH_2CH_2OOCCH_3$ | $-CH_2CH_2OOCCH_3$ | Red |
| 44 | $-(CH_2)_3OCH_3$ | 5-Br | 3-CH$_3$ | $-C_2H_5$ | $-CH_2CH_2OOCOC_2H_5$ | Red |
| 45 | $-(CH_2)_3OCH_3$ | 5-Br | 3-CH$_3$ | $-CH_2CH_2CN$ | $-C_2H_5$ | Red |
| 46 | $-(CH_2)_3$N(CH$_2$)$_3$CO | 5-Br | 3-CH$_3$ | $-CH_2CH_2$NCOCH$_2$CH$_2$CO | $-C_2H_5$ | Red |
| 47 | $-C_2H_5$ | 5-Br | 3-CH$_3$ | $-CH_2CH_2$NCO-O-C$_6$H$_4$CO | $-C_2H_5$ | Red |
| 48 | $-C_2H_5$ | 5-Br | 3-CH$_3$ | $-CH_2CH_2$NCOCH$_2$OCH$_2$CO | $-CH_2CH_2OCH_3$ | Red |
| 49 | $-C_2H_5$ | 5-Br | 3-NHCOCH$_3$ | $-CH_2CH_2NHCOCH_3$ | $-C_2H_5$ | Red |

-continued

| Ex. No. | R¹ | Substituent(s) on Ring B | R⁵,R⁶ | R⁷ | R⁸ | Shade on Polyester Fibers |
|---|---|---|---|---|---|---|
| 50 | —C₂H₅ | 5-Br | 3-NHCOCH₃ | —CH₂CH₂NHCOC₆H₅ | —C₂H₅ | Red |
| 51 | —C₂H₅ | 5-Br | 3-NHCOOC₂H₅ | —CH₂CH₂NHCOOC₂H₅ | —C₂H₅ | Red |
| 52 | —C₂H₅ | 5-Br | 3-NHCOC₂H₅ | —CH₂CH₂NHSO₂CH₃ | —C₂H₅ | Red |
| 53 | —CH₂C₆H₅ | 5-Br | 3-NHCOCH₃ | —CH₂CH₂OCH₃ | —C₂H₅ | Red |
| 54 | —CH₂C₆H₅ | 5-Br | 3-NHCOCH₃ | —C₆H₁₁ | —CH₂CH(OOCCH₃)CH₃ | Red |
| 55 | —CH₂C₂OH | 5-Br | 3-NHCOCH₃ | —CH₂C₆H₁₁ | —CH₂CH₂OOCCH₃ | Red |
| 56 | —CH₂CH₂OH | 5-Br | 3-NHCOCH₃ | —CH₂C₆H₅ | —CH₂CH₂OOCCH₃ | Red |
| 57 | —CH₂CH₂OH | 5-Br | 3-NHCOC₆H₅ | —C₂H₅ | —C₂H₅ | Red |
| 58 | —CH₂CH₂OH | 5-Br | 3-NHCOC₆H₅ | —CH₂CH₂OOCCH₃ | —CH₂CH₂OOCCH₃ | Red |
| 59 | —CH₂CH₂OOCCH₃ | 5-Br | 3-NHCONHC₂H₅ | —C₂H₅ | —C₂H₅ | Red |
| 60 | —CH₂CH₂OOCCH₃ | 5-Br | 3-NHSO₂CH₃ | —C₂H₅ | —C₂H₅ | Red |
| 61 | —CH₂CH₂OOCCH₃ | 5-Br | 3-NHCOCH₂OH | —C₂H₅ | —C₂H₅ | Red |
| 62 | —CH₂CH₂CONH₂ | 5-Br | 3-NHCOCH₂OOCCH₃ | —C₂H₅ | —C₂H₅ | Red |
| 63 | —CH₂CH₂CN | 5-Br | 3-NHCOCH₂OOCNHC₂H₅ | —C₂H₅ | —C₂H₅ | Red |
| 64 | —CH₂CH₂OOCC₂H₅ | 5-Br | 3-NHCOCH₃ | —CH₂CH₂OOCNHC₆H₅ | —C₂H₅ | Red |
| 65 | —CH₂C₆H₁₁ | 5-Br | 3-NHCOCH₃ | —CH₂CH₂OOCNHC₂H₅ | —C₂H₅ | Red |
| 66 | —CH₂C₆H₁₀-p-CH₂OH | 5-Br | 3-NHCOCH₃ | —CH₂CH(OH)CH₂Cl | —C₂H₅ | Red |
| 67 | —CH₂CH₂OOCOC₂H₅ | 5-Br | 3-NHCOCH₃ | —CH₂CH(OOCCH₃)CH₂Cl | —C₂H₅ | Red |
| 68 | —C₆H₅ | 5-Br | 3-NHCOCH₃ | —CH₂CH(OH)CH₂OCH(CH₃)₂ | —C₂H₅ | Red |
| 69 | —C₆H₅ | 5-Br | 3-NHCOCH₃ | —CH₂CH(OOCCH₃)CH₂OOCCH₃ | —C₂H₅ | Red |
| 70 | —C₆H₅ | 5-Br | 3-NHCOCH₃ | —CH₂CH₂CN | —C₂H₅ | Red |
| 71 | —C₆H₅ | 5-Br | 3-NHCOCH₃ | —CH₂CH₂OC₆H₅ | —C₂H₅ | Red |
| 72 | —CH₂CH₂N(CH₃)SO₂CH₃ | 5-Br | 3-NHCOCH₃ | —CH₂CH₂SC=N-o-C₆H₄S | —C₂H₅ | Red |
| 73 | —C₂H₅ | 3-Br-5-CH₃ | 3-NHCOCH₃ | —CH₂CH₂OOCCH₃ | —C₂H₅ | Red |
| 74 | —C₂H₅ | 3-CN-5-CH₃ | 3-NHCOCH₃ | —CH₂CH₂OOCCH₃ | —C₂H₅ | Violet |
| 75 | —C₂H₅ | 3-SO₂C₆H₅-5-CH₃ | 3-NHCOCH₃ | —CH₂CH₂OOCCH₃ | —C₂H₅ | Violet |
| 76 | —C₂H₅ | 3-SC₆H₅-5-CH₃ | 3-NHCOCH₃ | —CH₂CH₂OOCCH₃ | —C₂H₅ | Red |
| 77 | —CH₂CH₂CN | 5-CN | H | —CH₂CH₂COOCH₃ | —C₂H₅ | Red |
| 78 | —C₂H₅ | 5-CN | 3-NHCOCH₃ | —CH₂CH₂COOCH₃ | —C₂H₅ | Violet |
| 79 | —C₂H₅ | 5-CN | 3-NHCOCH₃ | —CH₂CH₂OOCCH₃ | —CH₂CH₂OOCCH₃ | Violet |
| 80 | —(CH₂)₃CH₃ | 5-CN | 3-NHCOCH₃ | —CH₂CH₂CN | —C₂H₅ | Violet |
| 81 | —CH₂CH₂CH₃ | 5-Cl | 3-NHCOCH₃ | —CH₂CH₂CN | —C₂H₅ | Violet |
| 82 | —CH₂CH₂OH | 3,5-di-Cl | 3-NHCOCH₃ | —CH₂CH₂CONH₂ | —C₂H₅ | Violet |
| 83 | —C₂H₅ | 5-CN | 3-CH₃ | —CH₂CH₂CN | —C₂H₅ | Red |
| 84 | —CH₂CH₂CN | 5-CN | H | —CH₂CH₂OOCCH₃ | —C₂H₅ | Red |
| 85 | —CH₂CH₂OOCCH₃ | 5-CN | 3-NHCOC₂H₅ | —CH₂C₆H₅ | —C₂H₅ | Violet |
| 86 | —C₂H₅ | 5-CN | 3-NHCOCH₃ | —CH₂CH(OOCCH₃)CH₂OOCCH₃ | —C₂H₅ | Violet |
| 87 | —C₂H₅ | 5-SO₂C₆H₅ | 3-NHCOCH₃ | —CH₂CH(OOCCH₃)CH₂OOCCH₃ | —C₂H₅ | Violet |
| 88 | —C₂H₅ | 5-SO₂C₆H₄-p-CH₃ | 3-NHCOCH₃ | —CH₂CH₂OOCOC₂H₅ | —C₂H₅ | Violet |
| 89 | —C₂H₅ | 5-SO₂-C₆H₄-p-Cl | 3-NHCOCH₃ | —CH₂CH₂OCH₂CH₂OC₂H₅ | —C₂H₅ | Violet |
| 90 | —C₂H₅ | 5-SO₂C₆H₄-p-NHCOCH₃ | 3-NHCOCH₃ | —CH₂CH₂OOCOCH₂CH₂OCH₃ | —C₂H₅ | Violet |
| 91 | —C₂H₅ | 5-SC₆H₅ | 3-NHCOCH₃ | —CH₂CH(OOCCH₃)CH₃ | —C₂H₅ | Red |
| 92 | —C₂H₅ | 5-SC₆H₄-p-C(CH₃)₃ | 3-NHCOOC₂H₅ | —C₂H₅ | —C₂H₅ | Red |
| 93 | —C₂H₅ | 5-SC₂H₅ | 3-NHCOCH(CH₃)₂ | —CH₂CH(CH₃)₂ | —C₂H₅ | Red |
| 94 | —C₂H₅ | 5-SC=N-o-C₆H₄S | 3-NHCOCH₃ | —CH₂CH₂OOCCH₃ | —C₂H₅ | Red |
| 95 | —C₂H₅ | 5-SC=NNHCH=N | 3-NHCOCH₃ | —C₂H₅ | —C₂H₅ | Red |
| 96 | —C₂H₅ | 5-SC=NN=CHO | 3-NHCOCH₃ | —C₂H₅ | —C₂H₅ | Red |
| 97 | —C₂H₅ | 5-SC=NHC=CHCH=N | 3-NHCOCH₃ | —C₂H₅ | —C₂H₅ | Red |
| 98 | —C₂H₅ | 5-OC₆H₅ | 3-NHCOCH₃ | —CH₂CH₂CN | —C₂H₅ | Scarlet |
| 99 | —C₂H₅ | 5-OC₆H₄-p-Cl | 3-NHCOCH₃ | —CH₂C₆H₄-p-COOCH₃ | —C₂H₅ | Scarlet |
| 100 | —C₂H₅ | 5-OC₆H₄-p-OCH₃ | 3-NHCOCH₃ | —C₆H₁₁ | —CH₂CH₂OOCCH₃ | Red |
| 101 | —C₂H₅ | 5-OCH₃ | 3-NHCOCH₃ | —CH₂C₆H₁₁ | —CH₂CH₂OOCCH₃ | Red |
| 102 | —C₂H₅ | 5-NO₂ | 3-NHCOCH₃ | —C₂H₅ | —CH₂CH₂OOCC₂H₅ | Violet |
| 103 | —C₂H₅ | 5-NO₂ | 3-NHCOCH₃ | —C₂H₅ | —C₂H₅ | Violet |
| 104 | —C₂H₅ | 5-CN | 2-OCH₃-5-NHCOCH₃ | —C₂H₅ | —C₂H₅ | Reddish-Blue |
| 105 | —C₂H₅ | 3,5-CN | 2-OCH₃-5-NHCOCH₃ | —C₂H₅ | —C₂H₅ | Greenish-Blue |
| 106 | —C₂H₅ | 3,5-di-SO₂C₆H₅ | 3-NHCOCH₃ | —CH₂CH₂OOCCH₃ | —C₂H₅ | Blue |
| 107 | —C₂H₅ | 3,5-di-NO₂ | 3-NHCOCH₃ | —C₂H₅ | —C₂H₅ | Blue |
| 108 | —C₂H₅ | 3,5-di-OC₆H₅ | 3-NHCOCH₃ | —C₂H₅ | —C₂H₅ | Red |
| 109 | —C₂H₅ | 3,5-di-SC=NNHCH=N | 3-NHCOCH₃ | —C₂H₅ | —C₂H₅ | Red |

-continued

| Ex. No. | R¹ | Substituent(s) on Ring B | R⁵,R⁶ | R⁷ | R⁸ | Shade on Polyester Fibers |
|---|---|---|---|---|---|---|
| 110 | $-C_2H_5$ | 3,5-di-CN | 3-NHCOC$_6$H$_5$ | $-C_2H_5$ | $-C_2H_5$ | Blue |
| 111 | $-C_2H_5$ | 3,5-di-CN | 3-NHCOOC$_2$H$_5$ | $-C_2H_5$ | $-C_2H_5$ | Blue |
| 112 | $-C_2H_5$ | 3,5-di-CN | 3-NHCONHC$_2$H$_5$ | $-C_2H_5$ | $-C_2H_5$ | Blue |
| 113 | $-C_2H_5$ | 5-CN | H | $-CH_2CH_2CN$ | $-CH_2CH_2OOCCH_3$ | Red |
| 114 | $-C_2H_5$ | 5-CN | 3-CH$_3$ | $-CH_2CH_2OOCCH_3$ | $-CH_2CH_2OOCCH_3$ | Red |
| 115 | $-C_2H_5$ | 5-CN | 3-NHCOC$_2$H$_5$ | $-CH_2CH_2OOCCH_3$ | $-CH_2CH_2OOCCH_3$ | Violet |
| 116 | $-C_2H_5$ | 5-CN | 2-CH$_3$-5-NHCOCH$_3$ | $-CH(CH_3)C_2H_5$ | H | Violet |
| 117 | $-C_2H_5$ | 6-NO$_2$ | H | $-CH_2CH_2CN$ | $-C_2H_5$ | Red |
| 118 | $-C_2H_5$ | 6-NO$_2$ | 3-NHCOCH$_3$ | $-CH_2C_6H_5$ | $-C_2H_5$ | Red |
| 119 | $-C_2H_5$ | 4-Br-6-NO$_2$ | 3-NHCOCH$_3$ | $-CH_2CH_2OOCCH_3$ | $-CH_2CH_2OOCCH_3$ | Violet |
| 120 | $-C_2H_5$ | 4-Br-6-NO$_2$ | 3-NHCOCH$_3$ | $-CH_2CH_2OOCCH_3$ | $-C_2H_5$ | Violet |
| 121 | $-C_2H_5$ | 4-Br-6-NO$_2$ | 3-NHCOCH$_3$ | $-CH_2CH_2CH_3$ | $-C_2H_5$ | Violet |
| 122 | $-C_2H_5$ | 4-Br-6-NO$_2$ | 3-NHCOCH$_3$ | $-C_6H_{11}$ | $-C_2H_5$ | Violet |
| 123 | $-C_2H_5$ | 4-Br-6-NO$_2$ | 3-NHCOCH$_3$ | $-C_6H_{11}$ | $-CH_2CH_2OOCCH_3$ | Violet |
| 124 | $-C_2H_5$ | 4-Br-6-NO$_2$ | 3-NHCOCH$_3$ | $-CH_2CH(OOCCH_3)CH_2OOCCH_3$ | $-C_2H_5$ | Violet |
| 125 | $-C_2H_5$ | 4-CN-6-NO$_2$ | 2-OCH$_3$-5-NHCOCH$_3$ | $-C_2H_5$ | $-C_2H_5$ | Blue |
| 126 | $-C_2H_5$ | 4-SO$_2$C$_6$H$_5$-6-NO$_2$ | 2-OCH$_3$-5-NHCOCH$_3$ | $-C_2H_5$ | $-C_2H_5$ | Blue |
| 127 | $-C_2H_5$ | 4-OC$_6$H$_5$-6-NO$_2$ | 3-NHCOCH$_3$ | $-CH_2CH_2OOCCH_3$ | $-CH_2CH_2OOCCH_3$ | Violet |
| 128 | $-C_2H_5$ | 4-SCH$_2$CH$_2$OH-6-Br | 3-NHCOCH$_3$ | $-CH_2CH_2OOCCH_3$ | $-CH_2CH_2OOCCH_3$ | Red |
| 129 | $-C_2H_5$ | 4,6-di-Br | 3-NHCOCH$_3$ | $-C_2H_5$ | $-C_2H_5$ | Red |
| 130 | $-C_2H_5$ | 4-CN-6-Br | 3-NHCOCH$_3$ | $-C_2H_5$ | $-C_2H_5$ | Violet |
| 131 | $-C_2H_5$ | 4-SO$_2$C$_6$H$_5$-6-Br | 3-NHCOCH$_3$ | $-C_2H_5$ | $-C_2H_5$ | Violet |
| 132 | $-C_2H_5$ | 4,6-di-Cl | 3-NHCOCH$_3$ | $-C_2H_5$ | $-C_2H_5$ | Red |
| 133 | $-C_2H_5$ | 4,6-di-Cl | 3-NHCOCH$_3$ | $-CH_2CH_2OOCCH_3$ | $-CH_2CH_2OOCCH_3$ | Red |
| 134 | $-C_2H_5$ | 4-SO$_2$CH$_3$-6-Br | 3-NHCOCH$_3$ | $-CH_2CH_2OOCCH_3$ | $-CH_2CH_2OOCCH_3$ | Violet |
| 135 | $-C_2H_5$ | 4,6-di-NO$_2$ | 3-NHCOCH$_3$ | $-C_2H_5$ | $-C_2H_5$ | Blue |
| 136 | $-C_2H_5$ | 4-Cl-6-NO$_2$ | H | $-CH_2CH_2CN$ | $-CH_2C_6H_5$ | Red |
| 137 | $-C_2H_5$ | 6-NO$_2$ | 3-NHCOCH$_3$ | $-CH_2CH_2OCH_2CH_2-$ | | Red |
| 138 | $-C_2H_5$ | 6-NO$_2$ | 3-CH$_3$ | $-CH_2CH_2N(COCH_3)CH_2CH_2-$ | | Red |
| 139 | $-(CH_2)_3CH_3$ | 3,5-di-CN | 3-NHCOCH$_3$ | $-CH_2CH_2OOCCH_3$ | $-C_2H_5$ | Blue |

The compounds of the invention can be applied to polyester by known disperse dyeing techniques employing carriers, surfactants, dispersing agents, etc. Dyeing can be conducted at atmospheric or superatmospheric pressures. The following example illustrates a dyeing procedure for applying the azo compounds of the invention to dye polyester textile materials at atmospheric pressure and at the boil:

EXAMPLE 140

The azo compound of Example 11 (0.1 g.) is dissolved in 10 cc. of 2-methoxyethanol. A small amount (3 to 5 cc.) of a 3% sodium lignin sulfonate aqueous solution is added, with stirring, and then the volume of the bath is brought to 300 cc. with water. 3 cc. of a chlorinated benzene emulsion carrier (Tanavol) is added to the bath and 10.0 g. of a textile fabric made of poly(ethylene terephthalate) fibers is placed in the bath and worked 10 min. without heat. The dyeing is carried out at the boil for 1 hr. The dyed fabric is removed from the dyebath and scoured for 20 min. at 80°C. in a solution containing 1 g./l. neutral soap and 1 g./l. sodium carbonate. The fabric is then rinsed, dried in an oven at 250°F. and heat set (for the removal of residual carrier) for 5 min. at 350°F. The fabric is dyed a bright shade of red and exhibits excellent fastness properties when tested according to conventional methods such as those described in the *Technical Manual of the American Association of Textile Chemists and Colorists*, 1968 edition.

The following example describes a method by which our compounds can be applied to texturized polyester fibers:

EXAMPLE 141

The azo compound of Example 139 (66.7 mg.) is dissolved/dispersed in 10 cc. of 2-methoxyethanol in a Launder-Ometer container to which is then added with stirring about 0.2 g. sodium lignin sulfonate and 0.2 g. of a surfactant (Igepon T51) from a stock solution containing both components. The volume of the bath is brought to 300 ml. with water and 0.3 g. of a butyl benzoate emulsion carrier (DAC-888) fibers is wet out and placed in the bath which is then sealed and affixed to the rotating arm of a Launder-Ometer set at 120°F. After placing the container-bath in rotation the Launder-Ometer is set at 260°F. and after the heating medium reaches that temperature, dyeing with rotation is continued for 1½ hours. After allowing the container-bath to cool, the dyed fabric is removed, rinsed with water and dried. If necessary, residual carrier can be removed by heat setting as described in the preceding example.

The compounds of the invention can also be applied to polyester textile materials by the heat fixation technique described in U.S. Pat. No. 2,663,612 and in the *American Dyestuff Reporter*, 42, 1 (1953). The following procedure describes how the azo compounds of the invention can be applied to polyester materials by the heat fixation technique:

EXAMPLE 142

A mixture of 500 mg. of the compound of Example 19, 150 mg. of a sodium lignosulfonate dispersing agent (Marasperse N), 150 mg. of a partially desulfonated sodium lignosufonate (Marasperse CB), 0.5 ml. glycerin, and 1.0 ml. of water is ground in a micro-size container (an accessory for a 1-quart size Szegvari Attritor) for approximately 3.5 hrs. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65°C. with continuous stirring. A thickener and penetrating mixture is prepared by mixing 1 ml. of a complex diaryl sulfonate surfactant, (Compound 8-S), 3 ml. of a 3% solution of a sodium N-methyl-N-oleoyltaurate (Igepon T-S1), 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 min. The dye mixture is then filtered through cheesecloth to remove the stainless steel balls and added to the reservoir of a Butterworth padder where it is heated to about 45° to 60°C. 10 g. of a fabric of poly(ethylene terephthalate) fibers and 10 g. of a fabric of 65/35 spun poly(ethylene terephthalate) cotton fibers are sewn together, end-to-end, and padded for 5 min. of continuous cycling through the dye mixture and between three rubber squeeze rollers of the padder. Dye mixture pick-up is about 60% based on the weight of the fabrics. The padded fabrics are dried at 200°F. and then heat-fixed for 2 min. at 415°F. in a forced air oven. The dyed fabrics are scoured for 20 min. at 65° to 70°C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and fastness to light and sublimation.

The heat fixation dyeing procedure described above can be varied by the substitution of other dispersing agents, surfactants, suspending agents, thickeners, etc. The temperature and time of the heat-fixation step can also be varied.

Fibers having a basis of a linear terephthalate polyester and sold under the trademarks "Kodel","Dacron", "Fortrel", "Vycron" and "Terylene" are illustrative of the linear aromatic polyester textile materials that can be dyed with the novel azo compounds. Polyesters prepared from ethylene glycol and dimethylterephthalate and cyclohexanedimethanol and dimethylterephthalate are examples of such linear aromatic polyesters. Polyesters prepared from cyclohexanedimethanol and dimethylterephthalate are more particularly described in U.S. Pat. No. 2,901,466. Poly(ethylene terephthalate) polyester fibers are described, for example, in U.S. Pat. No. 2,465,319. The polymeric linear polyester materials disclosed in U.S. Pat. Nos. 2,945,010; 2,957,745 and 2,989,363, for example, can be dyed. The linear aromatic polyester materials specifically named have a melting point of at least 0.35 and preferably, about 0.6. The inherent viscosity of the poly(1,-4cyclohexylenedimethylene terephthalate) polymer is also at least 0.35. These inherent viscosities are measured at 25°C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in detail with particular reference to preferred embodiments thereof, but it will be understood that variations and modifications can be effected within the spirit and scope of the invention.

we claim:
1. A compound having the formula

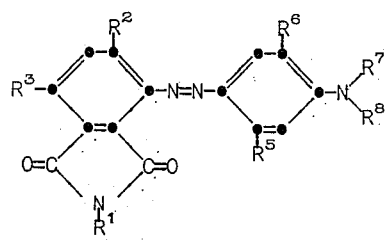

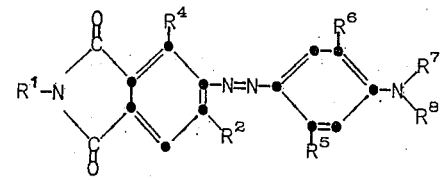

wherein
$R^1$ is hydrogen; lower alkyl; arylmethy; cyclohexylmethyl; 2-cyanoethyl; 2-carbamoylethyl; aryl; cyclohexyl; or —Z—$R^{17}$ in which Z is ethylene, propylene, or trimethylene and $R^{17}$ is succinimido, glutarimido, phthalimido, hydroxy, lower alkanoyloxy, 2-pyrrolidinone, or lower alkoxy;

$R^2$ is lower alkyl, chlorine, bromine, nitro, lower alkylsulfonyl, arylsulfonyl, arylthio, aryl-lower-alkylthio, cyclohexylthio, lower alkoxy, aryloxy, 2-benzothiazolythio, 2-thiazolylthio, 2-thiadiazolythio, 2-oxadiazolythio, 1,2,4-triazol-3-ylthio, or 2-pyrimidinylthio;

$R^3$ is chlorine, bromine or nitro;

$R^4$ is hydrogen, halogen, cyano, nitro, lower alkylsulfonyl, arylsulfonyl, arylthio, cyclohexylthio, lower alkoxy, aryloxy, 2-benzothiazolylthio, 2-thiazolythio, 2-thiadiazolylthio, 2-oxadiazolylthio, 1,2,4-triazol-3-ylthio, or 2-pyrimidinylthio;

$R^5$ is hydrogen, lower alkyl, lower alkoxyl, halogen or -NH-$R^9$ in which $R^9$ is formyl, lower alkanoyl, lower alkylsulfonyl, aroyl, lower alkoxycarbonyl, carbamoyl, lower alkylcarbamoyl, or lower alkanoyl substituted with halogen, aryl, cyano, lower alkoxy, aryloxy, benzyloxy, lower alkylthio, lower alkylsulfonyl or lower alkanoyloxy;

$R^6$ is hydrogen, lower alkyl or lower alkoxy;

$R^7$ individually is alkyl containing one to eight carbon atoms; cyclohexyl; cyclohexyl substituted with lower alkyl; or lower alkyl substituted with lower alkoxy, aryl, aryloxy, cyclohexyl, cyano, lower alkanoyloxy, lower alkoxycarbonyl, lower alkoxycarbonyloxy, aroyloxy, lower alkylcarbamoyloxy, arylcarbamoyloxy, or

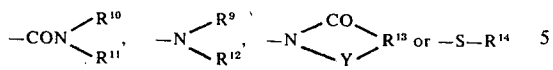

wherein
$R^{10}$ individually is hydrogen, lower alkyl or aryl;
$R^{11}$ individually is hydrogen or lower alkyl;
$R^{10}$ and $R^{11}$ taken together are —$(CH_2)_5$ or —$CH_2CH_2OCH_2CH_2$—;
$R^9$ is defined above;
$R^{12}$ is hydrogen, lower alkyl, aryl, or cyclohexyl;
$R^{13}$ is ethylene, propylene, trimethylene o-cyclohexylene, or o-arylene, or when X is —CO—, $R^{13}$ also can be —$NHCH_2$—, —$N(lower\ alkyl)CH_2$—, —$SCH_2$—, —$OCH_2$—, or —$CH_2OCH_2$—;
Y is —$CH_2$, —CO—, or —$SO_2$—; and
$R^{14}$ is aryl, benzyl, cyclohexyl, 1,2,4-triazol-3-yl, or 2-benzothiazolyl;
$R^8$ individually is hydrogen; lower alkyl; lower alkyl substituted with lower alkoxy, aryl, aryloxy, cyclohexyl, lower alkanoyloxy, lower alkoxycarbonyl or lower alkoxycarbonyloxy; allyl; or aryl;
$R^7$ and $R^8$ taken together is —$CH_2CH_2$—Y—$CH_2CH_2$— in which Y is —$CH_2$—, —$N(R^9)$, —O—, —S—, —SO—, or —$SO_2$—;
in which each aryl moiety is phenyl, tolyl, anisyl, ethoxyphenyl, or chlorophenyl.

2. A compound according to claim 1 having the formula

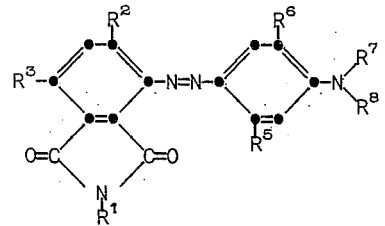

or

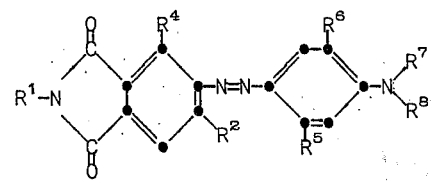

wherein
$R^1$ is lower alkyl; arylmethyl; cyclohexylmethyl; 2-cyanoethyl; 2-carbamoylethyl; aryl; cyclohexyl; or —Z—$R^{17}$ in which Z is ethylene, propylene, or trimethylene and $R^{17}$ is succinimido, glutarimido, phthalimido, hydroxy, lower alkanoyloxy, 2-pyrrolidinone, or lower alkoxy;
$R^2$ is hydrogen, chlorine, bromine or cyano;
$R^3$ is chlorine, bromine or nitro;
$R^4$ is chlorine, bromone or cyano;
$R^5$ is hydrogen, methyl, lower alkanoyl, benzamido or lower alkoxycarbonyl;
$R^6$ is hydrogen or when $R^8$ is hydrogen, $R^6$ is methyl;

$R^7$ is lower alkyl, allyl; cyclohexyl; arylmethyl; cyclohexylmethyl; 2-cyanoethyl 2-carbamoylethyl; N-lower alkyl-2-carbamoylethyl; N,N-di-lower alkyl-2-carbamoylethyl; or —Z—$R^{15}$ in which Z is ethylene, propylene or trimethylene and $R^{15}$ is lower alkanoyloxy, lower alkoxycarbonyl, lower alkoxycarbonyloxy, succinimido, glutarimido, phthalimido, aroyloxy, lower alkoxy or

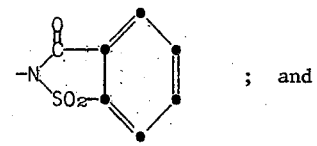 ; and $R^8$ is hydrogen; lower alkyl; cyclohexyl; arylmethyl; cyclohexylmethyl; or —Z—$R^{16}$ in which Z is ethylene, propylene or trimethylene and $R^{16}$ is lower alkanoyloxy, lower alkoxycarbonyl or lower alkoxycarbonyloxy;
in which each aryl moiety is phenyl, tolyl, anisyl, ethoxyphenyl or chlorophenyl and when $R^7$ and $R^8$ both represent —Z—$R^{15}$ and —Z—$R^{16}$ the Z groups are the same.

3. A compound according to claim 1 having the formula

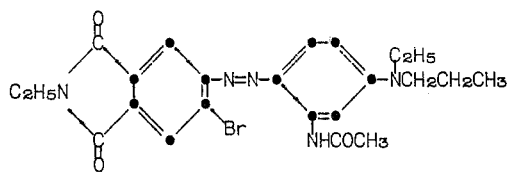

4. A compound according to claim 1 having the formula

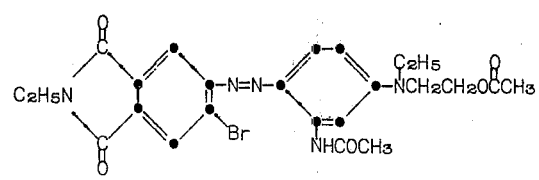

5. A compound according to claim 1 having the formula

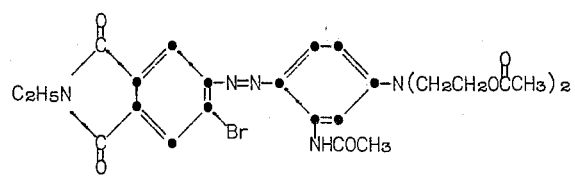

6. A compound according to claim 1 having the formula

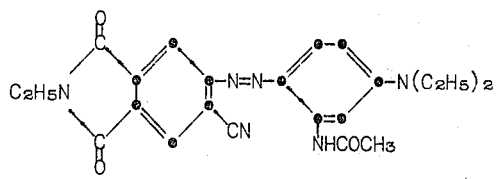
7. A compound according to claim 1 having the formula
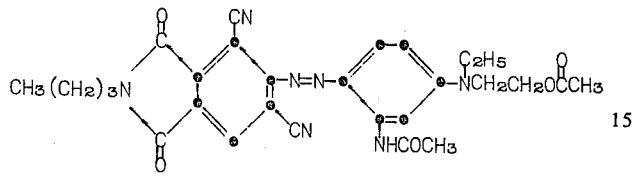
8. A compound according to claim 1 having the formula
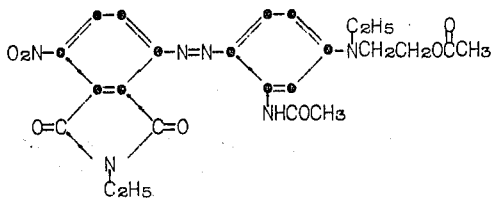
* * * * *